US012666331B2

(12) United States Patent
Li

(10) Patent No.: US 12,666,331 B2
(45) Date of Patent: Jun. 23, 2026

(54) METHOD FOR DETERMINING FREQUENCY POINT AND TERMINAL DEVICE

(71) Applicant: GUANGDONG OPPO MOBILE TELECOMMUNICATIONS CORP., LTD., Dongguan (CN)

(72) Inventor: Haitao Li, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 301 days.

(21) Appl. No.: 18/239,094

(22) Filed: Aug. 28, 2023

(65) Prior Publication Data

US 2023/0413147 A1 Dec. 21, 2023

Related U.S. Application Data

(63) Continuation of application No. PCT/CN2021/092660, filed on May 10, 2021.

(51) Int. Cl.
*H04W 36/24* (2009.01)
*H04W 36/08* (2009.01)
*H04W 56/00* (2009.01)

(52) U.S. Cl.
CPC ....... *H04W 36/249* (2023.05); *H04W 36/083* (2023.05); *H04W 56/0065* (2013.01)

(58) Field of Classification Search
CPC . G01S 19/52; H04W 36/249; H04W 36/0094; H04W 36/083; H04W 56/0065; H04W 84/06
See application file for complete search history.

(56) References Cited

U.S. PATENT DOCUMENTS

| | | | |
|---|---|---|---|
| 9,031,576 B2 | 5/2015 | Wigren | |
| 2010/0234043 A1 | 9/2010 | Wigren | |
| 2015/0270890 A1 | 9/2015 | Vasavada | |
| 2018/0013484 A1 | 1/2018 | Vasavada | |
| 2020/0313755 A1* | 10/2020 | Chuang ................ | H04L 5/0048 |
| 2022/0368412 A1* | 11/2022 | Xiong ................ | H04B 7/18513 |
| 2024/0023045 A1* | 1/2024 | Da Silva ............. | H04W 36/249 |

FOREIGN PATENT DOCUMENTS

| | | |
|---|---|---|
| CN | 101442786 A | 5/2009 |
| CN | 110839262 A | 2/2020 |
| WO | 2021064284 A1 | 4/2021 |

OTHER PUBLICATIONS

63125385,Specification,Dec. 14, 2020 (Year: 2020).*
Supplementary European Search Report in the European application No. 21941116.2, mailed on Feb. 7, 2024. 13 pages.

(Continued)

*Primary Examiner* — Ji-Hae Yea
(74) *Attorney, Agent, or Firm* — BAYES PLLC

(57) ABSTRACT

Embodiments of the present application provide methods for determining a frequency point and a terminal device. A method includes: a terminal device receives Doppler frequency offset assistance information; and the Doppler frequency offset assistance information is used to determine an actual frequency point to be measured or an actual frequency point of downlink synchronization of a target cell.

17 Claims, 4 Drawing Sheets

SMTC1, doppler shift1

SMTC2, doppler shift2 measurement object: SSB frequency F0 _ _ [////] _ _ _ _ _ _ _ [////] _ _ _ _ _ measurement configuration F0+doppler shift1 _ _ SMTC1 [////] _ _ _ _ _ _ _ _ _ _ _ _ _ _ UE RRM measurement F0+doppler shift2 _ _ _ _ _ _ _ _ _ SMTC2 [////] _ _ _ _ _ UE RRM measurement measurement object: SSB frequency F0 _ _ _ _ _ _ _ _ _ _ _ _ _ _ _ _ _ _ _ _

(56) References Cited

OTHER PUBLICATIONS

International Search Report in the international application No. PCT/CN2021/092660, mailed on Jan. 26, 2022. 5 pages with English translation.

Written Opinion of the International Search Authority in the international application No. PCT/CN2021/092660, mailed on Jan. 26, 2022. 10 pages with English translation.

3GPP TR 38.821 V1.0.0 (Dec. 2019), 3rd Generation Partnership Project; Technical Specification Group Radio Access Network; Solutions for NR to support non-terrestrial networks (NTN) (Release 16). Sections: Table 4.2-2: Reference scenario parameters. 143 pages.

* cited by examiner

100

200

| | |
|---|---|
| A terminal device receives Doppler shift assistance information | S210 | determining an actual frequency to be measured or an actual frequency for downlink synchronization of a target cell by utilizing the Doppler shift assistance information — S220

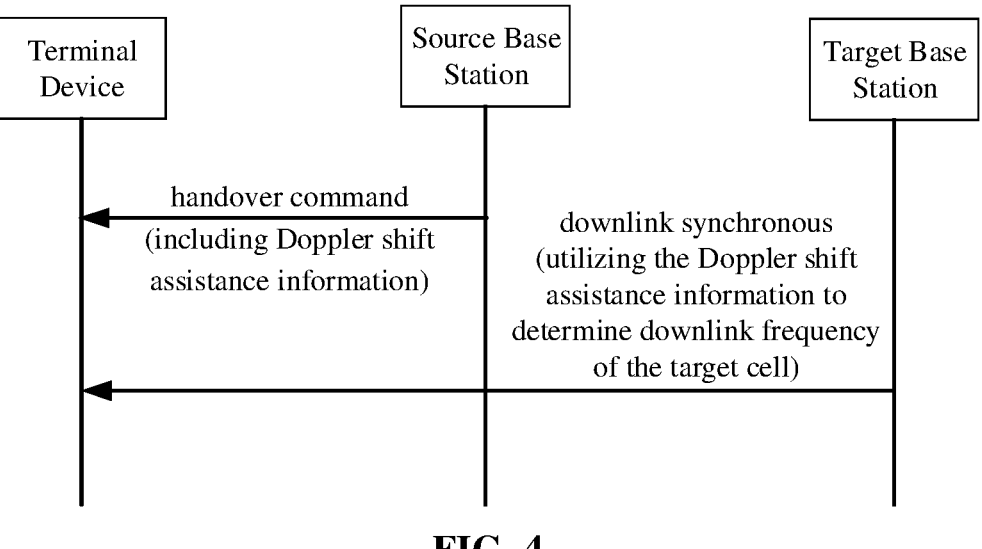
FIG. 4
500
A network device transmits Doppler shift assistance information, and the Doppler shift assistance information is used to determine an actual frequency to be measured or an actual frequency for downlink synchronization of a target cell
S510
FIG. 5
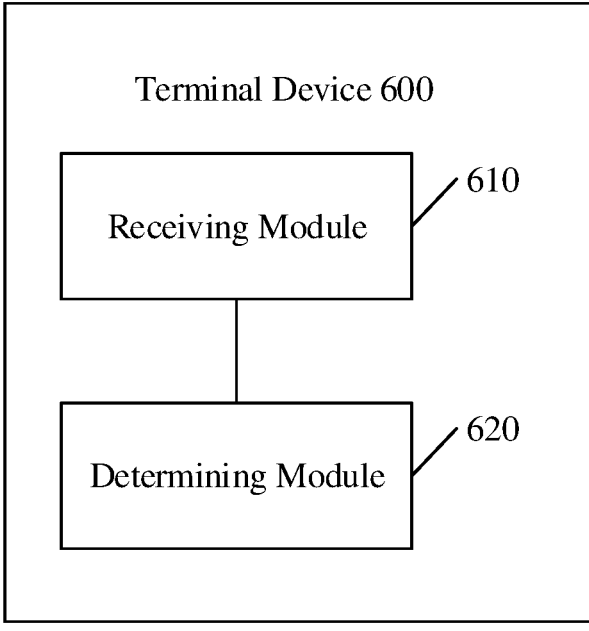
FIG. 6

METHOD FOR DETERMINING FREQUENCY POINT AND TERMINAL DEVICE

CROSS-REFERENCE TO RELATED APPLICATION

The present application is a continuation of International Application No. PCT/CN2021/092660 filed on May 10, 2021, the disclosure of which is hereby incorporated by reference in its entirety.

TECHNICAL FIELD

The disclosure relates to the field of communication, and particularly to a method for determining frequency and a terminal device.

BACKGROUND

At present, the technology of Non Terrestrial Network (NTN) is researched in the 3rd Generation Partnership Project (3GPP). The NTN generally provides communication services to terrestrial users using satellite communication.

Due to high-speed movement of satellites, when UE performs a New Radio (NR) measurement or a downlink synchronous handover of a target cell, a frequency actually needed to be measured or accessed may be different from a frequency indicated by a network, which causes the UE to perform a large number of blind search operations, and thus the complexity of the UE is higher.

SUMMARY

Embodiments of the present application provide a method for determining a frequency, a terminal device and a network device, which can realize that the terminal device determines the actual frequency to be measured and an actual frequency for downlink synchronization of a target cell.

An embodiment of the present application provides a method for determining a frequency. The method includes the following operations.

A terminal device receives Doppler shift assistance information.

The terminal device determines an actual frequency to be measured or an actual frequency for downlink synchronization of a target cell by using the Doppler shift assistance information.

The present application further provides a method for determining a frequency. The method includes the following operations.

A network device transmits Doppler shift assistance information, and the Doppler shift assistance information is used to determine an actual frequency to be measured or an actual frequency for downlink synchronization of a target cell.

The present application further provides a terminal device including a receiving module and a determining module.

The receiving module is configured to receive Doppler shift assistance information.

The determining module is configured to determine an actual frequency to be measured or an actual frequency for downlink synchronization of a target cell by using the Doppler shift assistance information.

An embodiment of the present application provides a terminal device including a processor and a memory for storing a computer program, where the processor is configured to call and run the computer program stored in the memory, and call the transceiver, to perform the above mentioned method.

BRIEF DESCRIPTION OF THE DRAWINGS

FIG. 4 is a flow diagram of an implementation of a second embodiment of the present application;

FIG. 5 is a flowchart of another method for determining a frequency according to an embodiment of the present application;

FIG. 6 is a schematic structural diagram of a terminal device according to an embodiment of the present application;

DETAILED DESCRIPTION

Figure 1:
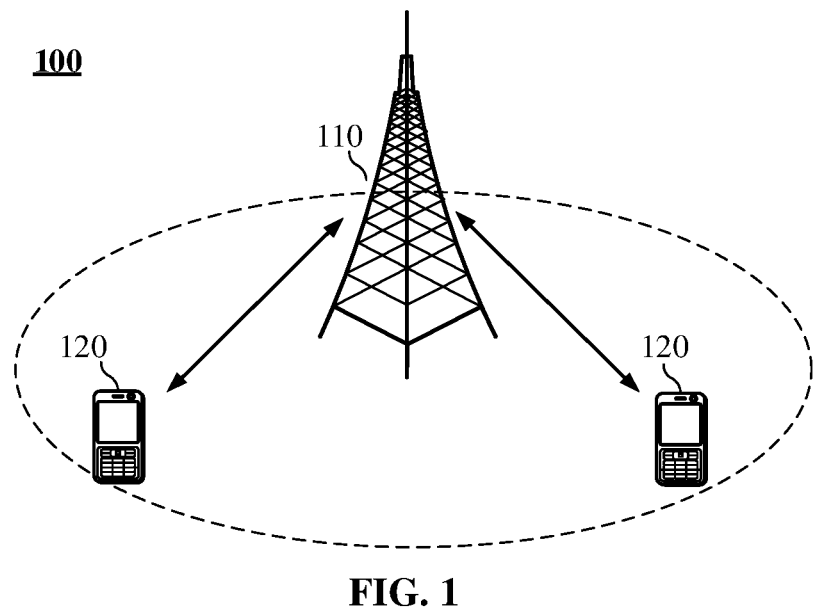
FIG. 1 is a schematic diagram of an application scenario of embodiments of the present application.

The technical solution in embodiments of the present application will be described below in combination with the appended drawings in embodiments of the present application.

It should be noted that the terms "first", "second", etc. in the description and claims of embodiments of the present application and the above drawings are used to distinguish similar objects and do not be used to describe a specific order or a prior order. The objects described by both the "first" and "second" can be same or different.

The technical solution in embodiments of the present application can be applied to various communication systems, such as a Global System of Mobile communication (GSM) system, a Code Division Multiple Access (CDMA) system, a Wideband Code Division Multiple Access (WCDMA) system, a General Packet Radio Service (GPRS) system, a Long Term Evolution (LTE) system, an Advanced Long Term Evolution (LTE-A) system, a New Radio (NR) system, an evolution system of the NR system, a LTE-based access to unlicensed spectrum (LTE-U) system, a NR-based access to unlicensed spectrum (NR-U) system, a Universal Mobile Telecommunications System (UMTS), a Wireless Local Area Network (WLAN), a Wireless Fidelity (WiFi), a 5th Generation (5G) system or other communication systems.

In general, traditional communication systems support a limited number of connections and are easy to implement. However, with the development of the communication technology, mobile communication systems will not only support traditional communication, but also support, for example, Device to Device (D2D) communication, Machine to Machine (M2M) communication, Machine Type Communication (MTC), or Vehicle to Vehicle (V2V) communication, etc. Embodiments of the present application can also be applied to these communication systems.

Alternatively, the communication system in embodiments of the present application can be applied to Carrier Aggregation (CA) scenarios, Dual Connectivity (DC) scenarios, or Standalone (SA) network deployment scenarios.

The applied spectrum is not limited in embodiments of the present application. For example, the embodiments of the present application may be applied to licensed spectrum or unlicensed spectrum.

Each embodiment is described in connection with a network device and a terminal device in embodiments of the present application. The terminal device may also be referred to as a User Equipment (UE), an access terminal, a user unit, a user station, a mobile station, a remote station, a remote terminal, a mobile device, a user terminal, a terminal, a wireless communication device, a user agent or a user apparatus, etc. The terminal device may be a station (ST) in the WLAN, a cellular telephone, a cordless telephone, a Session Initiation Protocol (SIP) telephone, a Wireless Local Loop (WLL) station, a Personal Digital Processing (PDA) device, a handheld device having a wireless communication function, a computing device or other processing device connected to a wireless modem, an on-board equipment, a wearable device, a next generation communication system, such as a terminal device in an NR network, or a terminal device in a future evolved Public Land Mobile Network (PLMN), etc.

As an example rather than a limitation, in embodiments of the present application, the terminal device may also be a wearable device. The wearable device can also be referred to as wearable intelligent device, which are a general name of the wearable devices developed by applying a wearable technology to intelligently design the daily wear, such as glasses, gloves, watches, clothing and shoes. The wearable device is a portable device that is worn directly on the body or integrated into the user's clothes or accessories. The wearable device is not only a kind of hardware device, but also a kind of device realizing powerful functions through software support, data interaction and cloud interaction. Generalized wearable smart devices include: a device with full functions and large size (such as smart watches or smart glasses), which can implement complete or partial functions without relying on a smart phone; and a device only focusing on a certain application function (such as various smart bracelets and smart jewelries for monitoring physical signs), which need to be used in conjunction with other devices (such as smart phone).

The network device may be a device for communicating with a mobile device, and the network device may be an Access Point (AP) in a WLAN, a Base Transceiver Station (BTS) in a GSM or CDMA, a NodeB (NB) in a WCDMA, an Evolved Node B (eNB or eNodeB), a relay station or an AP, an on-board equipment or a wearable device in a LTE, a gNB in an NR network or a network device in a future evolved PLMN network, etc.

In embodiments of the present application, the network device can provide services for a cell, and the terminal device communicates with the network device through the transmission resources (such as frequency domain resources, also called spectrum resources) used by the cell. The cell may be a cell corresponding to the network device (e.g., base station), and the cell may belong to a macro base station or a base station corresponding to a small cell. The small cell may include a metro cell, a micro cell, a pico cell, a femto cell, etc. These small cells have characteristics of small coverage and low transmission power, which are suitable for providing services of high-speed data transmission.

FIG. 1 schematically illustrates one network device 110 and two terminal devices 120. Optionally, the wireless communication system 100 may include a plurality of network devices 110, and any other number of terminal devices may be included within the coverage area of each network device 110, which is not limited by embodiments of the present application. Embodiments of the present application may be applied to one terminal device 120 and one network device 110, and may also be applied to one terminal device 120 and another terminal device 120.

Optionally, the wireless communication system 100 may also include other network entities, such as a Mobility Management Entity (MME), an Access and Mobility Management Function (AMF) and the like, embodiments of the present application are not limited thereto.

It should be understood that terms "system" and "network" in the present application may usually be exchanged. In the present application, the term "and/or" is only used for describing an association relationship of associated objects and represents that three relationships may exist. For example, A and/or B may represent three conditions: independent existence of A, existence of both A and B, and independent existence of B. In addition, character "/" in the present application usually represents that previous and next associated objects form an "or" relationship.

It should be understood that the "indication" mentioned in embodiments of the present application may be a direct indication, may be an indirect indication, or may represent that there is an association relationship. For example, A indicates B, may represent that A directly indicates B, e.g., B can be obtained through A, may also represent that A indirectly indicates B, e.g., A indicates C, and B can be obtained through C, may also represent that there is an association relationship between A and B.

In the description of the embodiments of the present application, the term "corresponding to" may represent that there is a direct correspondence or an indirect correspondence relationship between two elements, may also represent that there is an association relationship between the two elements, may also be a relationship in which one element indicates or is indicated by the other element, or one element configures or is configured by the other element, etc.

In order to facilitate understanding of the technical solution of the embodiments of the present application, the related technologies of the embodiments of the present application are described as follow, and the following related technologies as an optional scheme can be arbitrarily combined with the technical solution of the embodiments of the present application, all of which belong to the protection scope of the embodiments of the present application.

Due to high-speed movement of satellites, a frequency actually needed to be measured or accessed by a UE may be different from a frequency indicated by a network, when the UE performs a NR measurement or a downlink synchronous handover of a target cell.

The NR measurement is taken as an example, the measurement mainly refers to a mobility measurement in a connection state. After a network transmits a measurement configuration to a UE, the UE detects signal quality states of neighboring cells according to parameters, such as a measurement object and a report configuration, indicated in the measurement configuration and feeds back measurement report information to the network for performing a network handover or updating a neighboring cell relationship list. Each measurement frequency can be configured with one or more Synchronization Signal/Physical Broadcast Channel (SS/PBCH) block Measurement Timing Configuration (SMTC), and each SMTC uses a different offset to identify its time domain position. Each SMTC can be associated with a group of cells or satellites. However, due to the high-speed movement of satellites, the measurement frequency indicated by the network may have frequency offset during the UE measurement, which results in the UE not being able to measure signals of the neighboring cells.

Similar problems may also be occurred for a scenario that the UE performs the downlink synchronous handover of the target cell, that is, an actual downlink frequency to be accessed by the UE may be different from frequency information indicated in a handover indication from the network side, which result in the UE not being able to access accurately.

Figure 2:
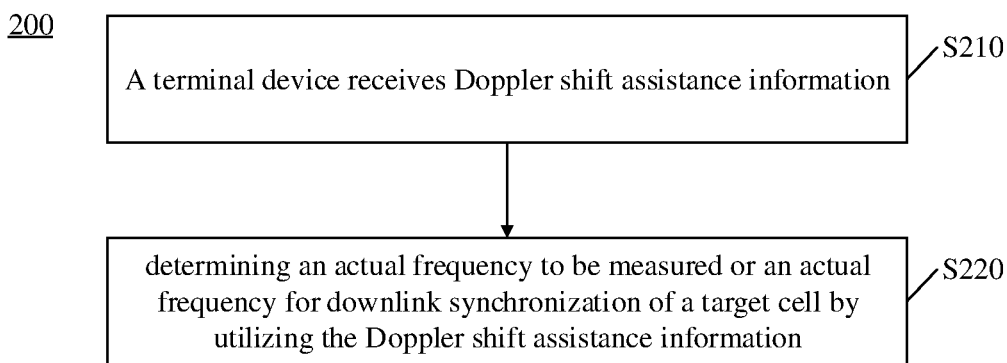
FIG. 2 is a flowchart of a method for determining a frequency according to an embodiment of the present application.

Embodiments of the present application provide a method for determining a frequency. FIG. 2 is a flowchart of a method for determining a frequency according to an embodiment of the present application. The method may optionally be applied to, but is not limited to, the system shown in FIG. 1. The method includes at least part of the following contents.

At S210, a terminal device receives Doppler shift assistance information.

At S220, the terminal device determines an actual frequency to be measured or an actual frequency for downlink synchronization of a target cell by using the Doppler shift assistance information.

In the process of a measurement or a downlink synchronization, the terminal device receives the Doppler shift assistance information configured by a network side, and uses the configured Doppler shift assistance information to perform a Radio Resource Management (RRM) measurement or the downlink synchronization of the target cell, so as to determine the actual frequency to be measured or the actual downlink frequency of the cell to be accessed, which reduces blind search operations of the terminal device and reduces the complexity of the terminal device.

In some embodiments, the Doppler shift assistance information includes at least one of:

at least one piece of Doppler shift information;

ephemeris information of at least one satellite; or identification of ephemeris information of at least one satellite.

Here, the Doppler shift information may include a Doppler shift relative to a ground stationary point.

The present application is described in detail below with specific embodiments in connection with the above two scenarios.

First Embodiment

When configuring a measurement configuration for a UE, a serving cell configures Doppler shift assistance information to assist the UE to perform RRM measurement. The specific implementation process includes the following operations.

In operation 1, a terminal device receives Radio Resource Control (RRC) measurement configuration information, and the RRC measurement configuration information includes the following information:

a Synchronization Signal/PBCH block (SSB) frequency to be measured;

at least one piece of STMC information corresponding to the SSB frequency to be measured; or the Doppler shift assistance information corresponding to each piece of STMC information.

The SMTC information may be offset information of the SMTC.

For example, the UE receives RRC measurement configuration information of the serving cell, and the RRC measurement configuration information is configured with measurement related parameters, specifically including a measurement object (SSB frequency) and the like. The measurement object corresponds to one or more piece of the SMTC information, such as offset information of the one or more piece of the SMTC. For each piece of the SMTC information or each piece of offset information of the SMTC, a set of Doppler shift assistance information are configured by the network side to associate it with the piece of the SMTC information or the piece of offset information of the SMTC. The Doppler shift assistance information may include the following information.

a) A set of Doppler shift information explicitly indicated, such as a Doppler shift relative to a ground stationary point.

b) Explicit ephemeris information of a set of satellites.

c) Explicit identification of ephemeris information of a set of satellites. For example, ephemeris information of a plurality of neighboring cells is broadcasted in a system message, only identification of the ephemeris information configured in the system message is required to be indexed to.

In operation 2, the UE performs RRM measurement according to the configured Doppler shift assistance information, specifically:

the terminal device uses the Doppler shift assistance information to determine at least one Doppler shift corresponding to at least one SMTC, which corresponds to the SSB frequency to be measured; and for the at least one SMTC, the terminal device obtains at least one actual frequency to be measured by adding the SSB frequency to be measured to the at least one Doppler shift corresponding to the at least one SMTC, respectively.

For example, a) For the case that the Doppler shift assistance information explicitly indicates a set of Doppler shift information, the terminal device determines information of a set of frequencies to be measured by using the measurement object and the set of Doppler shift information in the SMTC. Specifically: Actual measurement frequency=measurement object+Doppler shift.

b) For the case that the Doppler shift assistance information includes explicit ephemeris information of a set of satellites, the terminal device determines a moving direction and/or a moving speed of the at least one satellite by using the ephemeris information of the at least one satellite (i.e., a set of satellites) in the Doppler shift assistance information and determines a moving direction and/or a moving speed of the terminal device.

The Doppler shift for the at least one satellite is determined according to the moving direction and/or the moving speed of the at least one satellite and the moving direction and/or the moving speed of the terminal device.

Then, the terminal device determines information of a set of frequency to be measured by using the measurement object in the SMTC and the set of Doppler shift information. Specifically: Actual measurement frequency=measurement object+Doppler shift.

Alternatively, a manner for determining the moving direction and/or the moving speed of the terminal device may include: determining the moving direction and/or the moving speed of the terminal device according to a capability of Global Navigation Satellite System (GNSS) of the terminal device.

c) For the case that the Doppler shift assistance information includes explicit identification of ephemeris information of a set of satellites, the terminal device queries pre-configured ephemeris information by using the identification of the ephemeris information of the at least one satellite (i.e., a set of satellites) in the Doppler shift assistance information, and determines the ephemeris information of the at least one satellite according to a result of the querying, determines a moving direction and/or a moving speed of the at least one satellite by using the ephemeris information of the at least one satellite and determines a moving direction and/or a moving speed of the terminal device.

The Doppler shift for the at least one satellite is determined according to the moving direction and/or the moving speed of the at least one satellite and the moving direction and/or the moving speed of the terminal device.

Then, the terminal device determines information of a set of frequency to be measured by using the measurement object in the SMTC and the set of Doppler shift information. Specifically, Actual measurement frequency=measurement object+Doppler shift.

Alternatively, a manner for determining the moving direction and/or the moving speed of the terminal device may include: determining the moving direction and/or the moving speed of the terminal device according to a capability of Global Navigation Satellite System (GNSS) of the terminal device.

Figure 3:
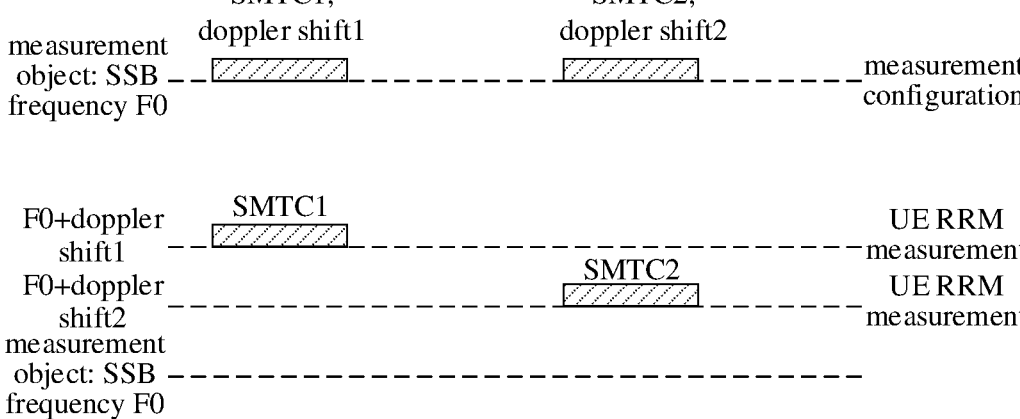
FIG. 3 is a schematic diagram of an implementation of a first embodiment of the present application.

FIG. 3 is a schematic diagram of an implementation of the first embodiment of the present application. As shown in FIG. 3, a terminal device receives measurement configuration information from a network side. The measurement configuration information includes one measurement object, i.e., a SSB frequency F0. The F0 corresponds to two SMTCs, including SMTC 1 and SMTC 2. The SMTC 1 and the SMTC 2 each corresponds to one Doppler shift, i.e., Doppler shift 1 and Doppler shift 2. When performing RRM measurement, the terminal device determines that the actual measurement frequency corresponding to the SMTC 1 is equal to F0+Doppler shift 1, and determines that the actual measurement frequency corresponding to the SMTC 2 is equal to F0+Doppler shift 2.

As can be seen, the terminal device compensates the frequency to be measured by using the Doppler shift assistance information configured by the network side, so that signals of neighboring cells can be accurately measured, which reduces the blind search operations of the terminal device, and reduces the complexity of the terminal device.

It should be noted that in the above process, the terminal device only compensates the Doppler shift of the service link, and a frequency offset caused by a feeder link is compensated by the network. For example, the frequency offset of the feeder link has been compensated for the frequency when the base station transmits the SSB, that is, the SSB frequency transmitted from the satellite is the SSB measurement frequency configured by the RRC.

Second Embodiment

The terminal device uses Doppler shift information when performing downlink synchronous handover of a target cell. FIG. 4 is a schematic diagram of an implementation of the second embodiment of the present application, including the following operations.

In operation 1, a terminal device receives a handover command. The handover command includes Doppler shift assistance information of a target cell.

For example, the terminal device receives the handover command from a source base station (source gNB). The handover command includes configuration information of the target cell and the Doppler shift assistance information. Specifically, the Doppler shift assistance information may include the following information.

a) Doppler shift information of the target cell explicitly indicated.

b) Explicit ephemeris information of a satellite of the target cell.

c) Explicit identification of ephemeris information of a satellite of the target cell. If the ephemeris information of a plurality of neighboring cells is broadcasted in a system message of a source cell, in which the ephemeris information of the satellite of the target cell is contained, the terminal device can identify the ephemeris information configured in the system message according to the identification, so as to obtain the ephemeris information of the satellite of the target cell.

In operation 2, the terminal device performs downlink synchronous of the target cell according to the Doppler shift assistance information configured in the handover command.

Specifically, the terminal device determines at least one Doppler shift of the target cell by using the Doppler shift assistance information;

in a case that the handover command includes information of a downlink frequency of the target cell (e.g., frequencyInfoDL frequency information), at least one actual frequency for downlink synchronization of the target cell is obtained by adding the downlink frequency of the target cell to the at least one Doppler shift, respectively; or in a case that the handover command does not include information of a downlink frequency of the target cell (e.g., frequencyInfoDL frequency information), at least one actual frequency for downlink synchronization of the target cell is obtained by adding a SSB frequency of a source cell to the at least one Doppler shift of the target cell, respectively, or at least one actual frequency for downlink synchronization of the target cell is obtained by subtracting a Doppler shift of a source cell from an actual received SSB frequency of the source cell, and adding it to the at least one Doppler shift of the target cell, respectively.

In the above process, according to the different contents contained in the Doppler shift assistance information, a manner for the terminal device to determine at least one Doppler shift of the target cell by using the Doppler shift assistance information includes at least the following:

a) For the case that the Doppler shift assistance information includes explicit ephemeris information of the satellite of the target cell, the terminal device determines a moving direction and/or a moving speed of the satellite of the target cell by using the ephemeris information of the satellite of the target cell in the Doppler shift assistance information and determines a moving direction and/or a moving speed of the terminal device.

The Doppler shift for the satellite of the target cell is determined according to the moving direction and/or the moving speed of the satellite of the target cell and the moving direction and/or the moving speed of the terminal device.

c) For the case that the Doppler shift assistance information includes explicit identification of ephemeris information of a satellite of the target cell, the terminal device queries pre-configured ephemeris information by using the identification of the ephemeris information of the satellite of the target cell in the Doppler shift assistance information, and determines the ephemeris information of the satellite of the target cell according to a result of the querying, determines a moving direction and/or a moving speed of the satellite of the target cell by using the ephemeris information of the satellite of the target cell and determines a moving direction and/or a moving speed of the terminal device.

The Doppler shift for the satellite of the target cell is determined according to the moving direction and/or the moving speed of the satellite of the target cell and the moving direction and/or the moving speed of the terminal device.

Alternatively, a manner for determining the moving direction and/or the moving speed of the terminal device may include: determining the moving direction and/or the moving speed of the terminal device according to a capability of GNSS of the terminal device.

As can be seen, when performing downlink synchronous handover of the target cell, the terminal device may compensate the frequency of a cell to be accessed by using the Doppler shift assistance information included in the handover command, so as to determine the actual downlink frequency of a cell to be accessed, which reduces the blind search operations of the terminal device, and reduces the complexity of the terminal device.

The present application further provides a method for determining a frequency, and FIG. 5 is another flowchart of a method for determining a frequency according to an embodiment of the present application, and the method may optionally be applied to, but is not limited to, the system shown in FIG. 1. The method includes at least part of the following contents.

At S510, a network device transmits Doppler shift assistance information. The Doppler shift assistance information is used to determine an actual frequency to be measured or an actual frequency for downlink synchronization of a target cell.

In some implementations, the Doppler shift assistance information includes at least one of:

at least one piece of Doppler shift information;

ephemeris information of at least one satellite; or identification of ephemeris information of at least one satellite.

In some implementations, the Doppler shift information includes a Doppler shift relative to a ground stationary point.

In some implementations, the operation that the network device transmits the Doppler shift assistance information includes the following operations:

the network device transmits RRC measurement configuration information. The RRC measurement configuration information includes the following information:

a SSB frequency to be measured;

at least one piece of STMC information corresponding to the SSB frequency to be measured; and the Doppler shift assistance information corresponding to each piece of the STMC information.

In some implementations, the SMTC information includes offset information of the SMTC.

In some implementations, the Doppler shift assistance information is used for a terminal device to determine at least one Doppler shift corresponding to at least one SMTC, which corresponds to the SSB frequency to be measured; and for the at least one SMTC, obtain at least one actual frequency to be measured by adding the SSB frequency to be measured to the at least one Doppler shift corresponding to the at least one SMTC, respectively.

In some implementations, the operation that the network device transmits the Doppler shift assistance information includes an operation that the network device transmits a handover command, where the handover command includes the Doppler shift assistance information of the target cell.

In some implementations, the above Doppler shift assistance information is used for the terminal device to perform the following operations: determining at least one Doppler shift of the target cell; in a case that the handover command includes information of a downlink frequency of the target cell, obtaining at least one actual frequency for downlink synchronization of the target cell by adding the downlink frequency of the target cell to the at least one Doppler shift, respectively; or, in a case that the handover command does not include information of a downlink frequency of the target cell, obtaining at least one actual frequency for downlink synchronization of the target cell by adding a SSB frequency of a source cell to the at least one Doppler shift of the target cell, respectively or obtaining at least one actual frequency for downlink synchronization of the target cell by subtracting a Doppler shift of a source cell from an actual received SSB frequency of the source cell, and adding it to the at least one Doppler shift of the target cell, respectively.

In some implementations, the Doppler shift assistance information is used for the terminal device to determine a moving direction and/or a moving speed of the at least one satellite by using the ephemeris information of the at least one satellite in the Doppler shift assistance information; and determine the Doppler shift for the at least one satellite according to the moving direction and/or the moving speed of the at least one satellite and a moving direction and/or a moving speed of the terminal device.

In some implementations, the Doppler shift assistance information is used for the terminal device to perform the following operations: querying pre-configured ephemeris information by using the identification of the ephemeris information of the at least one satellite in the Doppler shift assistance information, and determining the ephemeris information of the at least one satellite according to a result of the querying; determining a moving direction and/or a moving speed of the at least one satellite by using the ephemeris information of the at least one satellite; and determining the Doppler shift for the at least one satellite according to the moving direction and/or the moving speed of the at least one satellite and a moving direction and/or a moving speed of the terminal device.

As can be seen, in the above method for determining a frequency provided by the embodiment of the present application, the network device transmits the Doppler shift assistance information to the terminal device, which is used to assist the terminal device to determine the actual measurement frequency or access frequency when performing RRM measurement or downlink synchronous handover of the target cell, which reduces the blind search operations of the terminal device and reduces the complexity of the terminal device.

The embodiment of the present application further provides a terminal device. FIG. 6 is a schematic structural diagram of the terminal device according to the embodiment of the present application. The terminal device includes a receiving module 610 and a determining module 620.

The receiving module 610 is configured to receive Doppler shift assistance information.

The determining module 620 is configured to determine an actual frequency to be measured or an actual frequency for downlink synchronization of a target cell by using the Doppler shift assistance information.

Optionally, the Doppler shift assistance information includes at least one of:

at least one piece of Doppler shift information;

ephemeris information of at least one satellite; or identification of ephemeris information of at least one satellite.

Optionally, the Doppler shift information includes a Doppler shift relative to a ground stationary point.

Optionally, the receiving module 610 is configured to receive RRC measurement configuration information, where the RRC measurement configuration information includes following information:

a SSB frequency to be measured;

at least one piece of STMC information corresponding to the SSB frequency to be measured; and Doppler shift assistance information corresponding to each piece of the STMC information.

Optionally, the SMTC information includes offset information of the SMTC.

Optionally, the determining module 620 is configured to determine, using the Doppler shift assistance information, at least one Doppler shift corresponding to at least one SMTC which corresponds to the SSB frequency to be measured; and for the at least one SMTC, obtain at least one actual frequency to be measured by adding the SSB frequency to be measured to the at least one Doppler shift corresponding to the at least one SMTC respectively.

Optionally, the above receiving module 610 is configured to receive a handover command, where the handover command includes the Doppler shift assistance information of the target cell.

Optionally, the determining module 620 is configured to determine at least one Doppler shift of the target cell by using the Doppler shift assistance information and in a case that the handover command includes information of a downlink frequency of the target cell, obtain at least one actual frequency for downlink synchronization of the target cell by adding the downlink frequency of the target cell to the at least one Doppler shift, respectively; or in a case that the handover command does not include information of a downlink frequency of the target cell, obtain at least one actual frequency for downlink synchronization of the target cell by adding a SSB frequency of a source cell or the at least one Doppler shift of the target cell, respectively, or obtain at least one actual frequency for downlink synchronization of the target cell by subtracting a Doppler shift of a source cell from an actual received SSB frequency of the source cell, and adding it to the at least one Doppler shift of the target cell, respectively.

Optionally, the determining module 620 is configured to determine a moving direction and/or a moving speed of the at least one satellite by using the ephemeris information of the at least one satellite in the Doppler shift assistance information, determine a moving direction and/or a moving speed of the terminal device, and determine the Doppler shift for the at least one satellite according to the moving direction and/or the moving speed of the at least one satellite and the moving direction and/or the moving speed of the terminal device.

Optionally, the determining module 620 is configured to: query pre-configured ephemeris information by using the identification of the ephemeris information of the at least one satellite in the Doppler shift assistance information; determine the ephemeris information of the at least one satellite according to a result of the querying; determine a moving direction and/or a moving speed of the at least one satellite by using the ephemeris information of the at least one satellite; determine a moving direction and/or a moving speed of the terminal device; and determine the Doppler shift for the at least one satellite according to the moving direction and/or the moving speed of the at least one satellite and the moving direction and/or the moving speed of the terminal device.

Optionally, the determining module 620 is configured to determine the moving direction and/or the moving speed of the terminal device according to a capability of GNSS of the terminal device.

It should be understood that the above and other operations and/or functions of the modules in the terminal device according to the embodiments of the present application are intended to respectively implement the corresponding flow of the terminal device in the method of FIG. 2, which are not repeated here for the sake of brevity.

Figure 7:
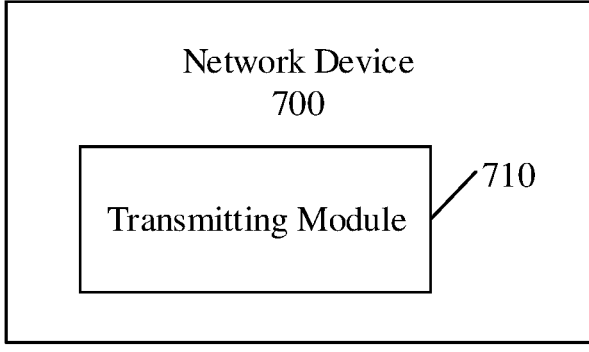
FIG. 7 is a schematic structural diagram of a network device according to an embodiment of the present application.

The embodiment of the present application further provides a network device. FIG. 7 is a schematic structural diagram of the network device according to the embodiment of the present application. The network device includes a transmitting module 710.

The transmitting module 710 is configured to transmit Doppler shift assistance information, where the Doppler shift assistance information is used to determine an actual frequency to be measured or an actual frequency for downlink synchronization of a target cell.

Optionally, the Doppler shift assistance information includes at least one of:

at least one piece of Doppler shift information;

ephemeris information of at least one satellite; or identification of ephemeris information of at least one satellite.

Optionally, the Doppler shift information includes a Doppler shift relative to a ground stationary point.

Optionally, the transmitting module 710 is configured to transmit RRC measurement configuration information, where the RRC measurement configuration information includes following information:

a SSB frequency to be measured;

at least one piece of STMC information corresponding to the SSB frequency to be measured; and Doppler shift assistance information corresponding to each piece of the STMC information.

Optionally, the SMTC information includes offset information of a SMTC.

Optionally, the Doppler shift assistance information is used for a terminal device to determine at least one Doppler shift corresponding to at least one SMTC, which corresponds to the SSB frequency to be measured and for the at least one SMTC, obtain at least one actual frequency to be measured by adding the SSB frequency to be measured to the at least one Doppler shift corresponding to the at least one SMTC, respectively.

Optionally, the above transmitting module 710 is configured to transmit a handover command, where the handover command includes the Doppler shift assistance information of the target cell.

Optionally, the Doppler shift assistance information is used for a terminal device to perform the following operations: determining at least one Doppler shift of the target cell; and in a case that the handover command includes information of a downlink frequency of the target cell, obtaining at least one actual frequency for downlink synchronization of the target cell by respectively adding the downlink frequency of the target cell to the at least one Doppler shift; or, in a case that the handover command does not include information of a downlink frequency of the target cell, obtain at least one actual frequency for downlink synchronization of the target cell by adding a SSB frequency of a source cell to the at least one Doppler shift of the target cell, respectively, or obtain at least one actual frequency for downlink synchronization of the target cell by subtracting a Doppler shift of a source cell from an actual received SSB frequency of the source cell, and adding it to the at least one Doppler shift of the target cell, respectively.

Optionally, the Doppler shift assistance information is used for the terminal device to determine a moving direction and/or a moving speed of the at least one satellite by using the ephemeris information of the at least one satellite in the Doppler shift assistance information and determine the Doppler shift for the at least one satellite according to the moving direction and/or the moving speed of the at least one satellite and a moving direction and/or a moving speed of the terminal device.

Optionally, the Doppler shift assistance information is used for the terminal device to perform the following operations: querying pre-configured ephemeris information by using the identification of the ephemeris information of the at least one satellite in the Doppler shift assistance information; determining the ephemeris information of the at least one satellite is determined according to a result of the querying; determining a moving direction and/or a moving speed of the at least one satellite by using the ephemeris information of the at least one satellite; and determining the Doppler shift for the at least one satellite according to the moving direction and/or the moving speed of the at least one satellite and a moving direction and/or a moving speed of the terminal device.

It should be understood that the above and other operations and/or functions of the modules in the network device according to the embodiments of the present application are intended to respectively implement the corresponding flow of the network device in the method of FIG. 5. For the sake of simplicity, it will not be elaborated herein.

It should be noted that the described functions related to each module (sub-module, unit or component, etc.) in the terminal device 600 and the network device 700 of the embodiments of the present application can be realized by different modules (sub-modules, units or components, etc.) or by the same module (sub-module, unit or component, etc.). For example, the receiving module and the determining module can be different modules or the same module, which can realize the corresponding functions in embodiments of the present application. In addition, the transmitting module and the receiving module in embodiments of the present application can be realized by a transceiver of the device, and some or all of the remaining modules can be realized by a processor of the device.

Figure 8:
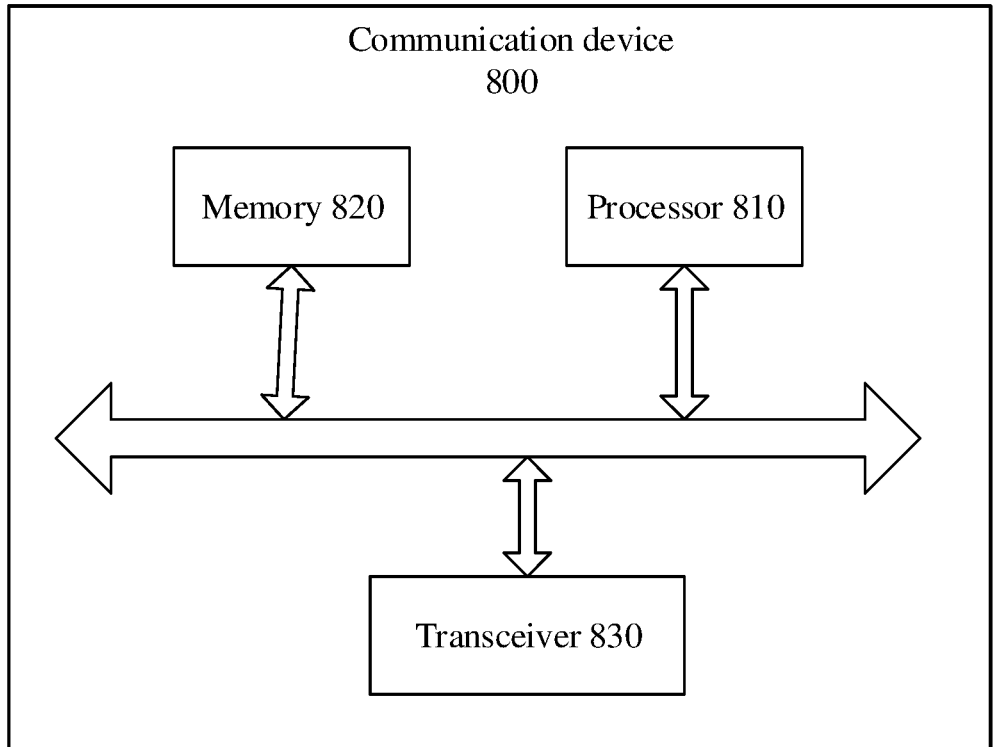
FIG. 8 is a schematic structural diagram of a communication device 800 according to an embodiment of the present application.

FIG. 8 is a schematic structural diagram of a communication device 800 according to an embodiment of the present application, the communication device 800 shown in FIG. 8 includes a processor 810 that can call and run a computer program from a memory to implement the method in embodiments of the present application.

Optionally, as shown in FIG. 8, the communication device 800 may further include a memory 820. The processor 810 may call and run a computer program from the memory 820 to implement the method in embodiments of the present application.

The memory 820 may be a separate device independent of the processor 810 or may be integrated in the processor 610.

Optionally, as shown in FIG. 8, the communication device 800 may further include a transceiver 830. The processor 810 may control the transceiver 830 to communicate with other devices. Specifically, the transceiver 830 may transmit information or data to other devices or receive information or data transmitted by other devices.

The transceiver 830 may include a transmitter and a receiver. The transceiver 830 may further include antennas, and the number of the antennas may be one or more.

Optionally, the communication device 800 can be a terminal device of the embodiments of the present application, and the communication device 800 can realize corresponding processes realized by the terminal device in various methods according to the embodiments of the present application. For the sake of simplicity, it will not be elaborated herein.

Optionally, the communication device 800 can be a network device according to the embodiments of the present application, and the communication device 800 can realize corresponding processes realized by the network device in the various methods according to the embodiments of the present application. For the sake of brevity, it will not be elaborated herein.

Figure 9:
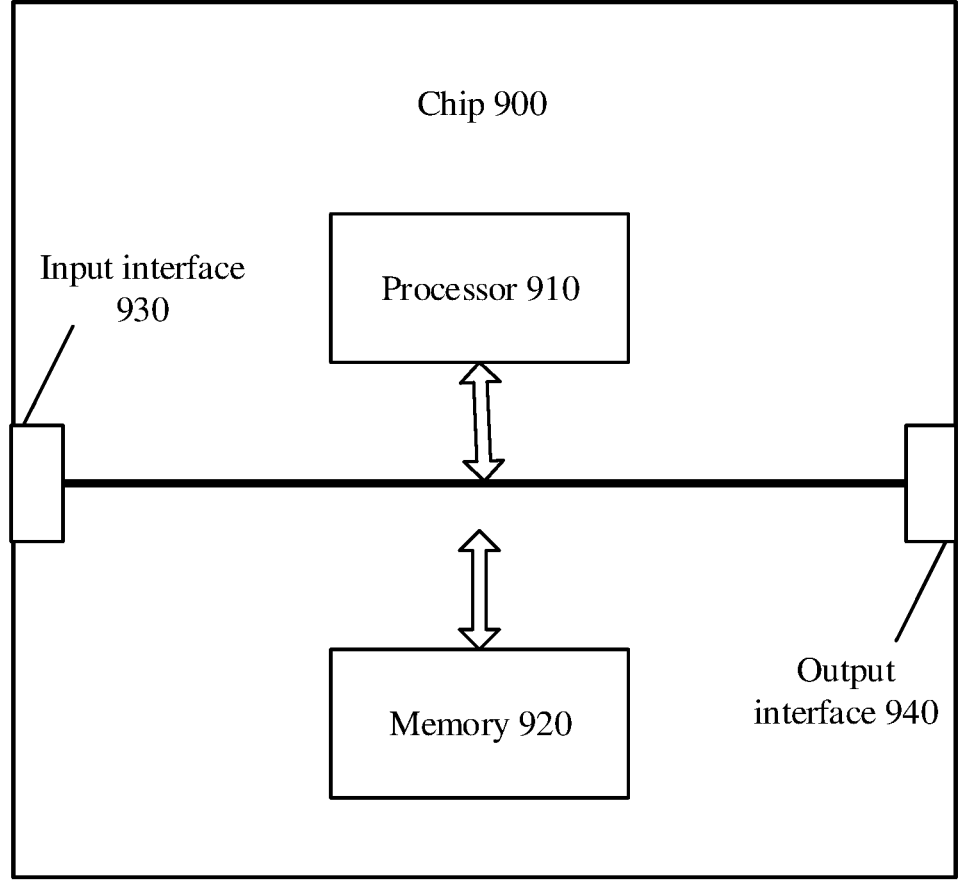
FIG. 9 is a schematic structural diagram of a chip 900 according to an embodiment of the present application.

FIG. 9 is a schematic structural diagram of a chip 900 according to an embodiment of the present application. The chip 900 shown in FIG. 9 includes a processor 910. The processor 910 can call and run computer programs from a memory to implement the method in the embodiments of the present application.

Optionally, as shown in FIG. 9, the chip 900 may further include a memory 920. The processor 910 can call and run the computer program from the memory 920 to implement the method in the embodiments of the present application.

The memory 920 may be a separate device independent of the processor 910 or may be integrated into the processor 910.

Optionally, the chip 900 may further include an input interface 930. The processor 910 can control the input interface 930 to communicate with other devices or chips, and in particular to obtain information or data sent by other devices or chips.

Optionally, the chip 900 may further include an output interface 940. The processor 910 may control the output interface 940 to communicate with other devices or chips, and in particular to output information or data to other devices or chips.

Optionally, the chip can be applied to the terminal device in the embodiments of the present application, and the chip can implement the corresponding processes realized by the terminal device in various methods according to the embodiments of the present application. For the sake of brevity, it will not be elaborated herein.

Optionally, the chip can be applied to the network device in the embodiments of the present application, and the chip can implement the corresponding processes realized by the network device in various methods according to the embodiments of the present application. For the sake of brevity, it will not be elaborated herein.

It is to be understood that the chip mentioned in the embodiments of the present application can also be referred to as a system level chip, a system chip, a chip system or an on-chip system chip, etc.

The processor mentioned above may be a general purpose processor, a digital signal processor (DSP), a field programmable gate array (FPGA), an application specific integrated circuit (ASIC), or other programmable logic devices, transistor logic devices, discrete hardware components, and the like. The general purpose processor mentioned above may be a microprocessor or any conventional processor or the like.

The memory mentioned above may be a volatile memory or a non-volatile memory, or may include both a volatile memory and a non-volatile memory. The non-volatile memory may be a read-only memory (ROM), a programmable ROM (PROM), an erasable PROM (EPROM), an electrically EPROM (EEPROM) or a flash memory. The volatile memory may be a random access memory (RAM).

It is to be understood that the memory described above is exemplary, but not limiting description, for example, the memory in the embodiments of the present application may also be a static RAM (SRAM), a dynamic RAM (DRAM), a synchronous DRAM (SDRAM), double data rate SDRAM (DDR SDRAM), enhanced SDRAM (ESDRAM), synch link DRAM (SLDRAM), Direct Rambus RAM (DR RAM), etc. That is, the memory in the embodiments of the present application is intended to include, but is not limited to, memories of these and any other suitable type.

In the above embodiments, it may be implemented in whole or in part by software, hardware, firmware or any combination thereof. When implemented by software, it can be implemented in whole or in part in the form of a computer program product. The computer program product includes one or more computer instructions. When the computer program instructions are loaded and executed on a computer, the processes or functions described in accordance with embodiments of the present application is generated in whole or in part. The computer may be a general purpose computer, a specific computer, a computer network, or other programmable devices. The computer instructions may be stored in a computer-readable storage medium or transmitted from one computer-readable storage medium to another computer-readable storage medium, for example, the computer instructions may be transmitted from one Web site, computer, server, or data center via wired (e.g. coaxial cable, optical fiber, Digital Subscriber Line (DSL)) or wireless (e.g. infrared, wireless, microwave, etc.) to another Web site, computer, server, or data center. The computer-readable storage medium may be any usable medium accessible to a computer or a data storage device, such as a server containing one or more usable media integration, data center, etc. The available media may be a magnetic media (e.g. floppy disk, hard disk, magnetic tape), an optical media (e.g. DVD), or a semiconductor media (e.g. Solid State Disk (SSD)), etc.

In the embodiment of the present application, the terminal device determines the actual frequency to be measured and an actual frequency for downlink synchronization of a target cell, thus reducing blind operations during detection and access of the terminal device and reducing the complexity of the terminal device.

It should be understood that in various embodiments of the present application, the size of the sequence number of the above-mentioned processes does not mean an execution order, and the execution order of each process should be determined by its function and inherent logic, and should not be limited in any way to the implementation process of the embodiments of the present application.

The skilled in the art will clearly appreciate that, for convenience and conciseness of description, the specific operating processes of the above-described systems, devices and units may refer to the corresponding processes in the aforementioned embodiments corresponding to the methods and will not be elaborated herein.

The above is only the specific embodiments of the present application, but the scope of protection of the present application is not limited to this. Any modifications and variations that can be easily known by the person skilled in the technical field within the scope of protection of the present application shall be included in the scope of protection of the present application. Therefore, the scope of protection of the present application shall be subject to the scope of protection of the claims.

The invention claimed is:

1. A method for determining a frequency, comprising:
receiving, by a terminal device, Doppler shift assistance information; and
determining, by the terminal device using the Doppler shift assistance information, an actual frequency to be measured,
wherein the receiving, by the terminal device, Doppler shift assistance information comprises:
receiving, by the terminal device, Radio Resource Control (RRC) measurement configuration information, wherein the RRC measurement configuration information comprises following information:
a SSB frequency to be measured;
at least one piece of Synchronization Signal/Physical Broadcast Channel (SS/PBCH) Block (SSB) Measurement Timing Configuration (SMTC) information corresponding to the SSB frequency to be measured; and
Doppler shift assistance information corresponding to each of the at least one piece of the SMTC information.

2. The method of claim 1, wherein the Doppler shift assistance information comprises at least one of:
at least one piece of Doppler shift information;
ephemeris information of at least one satellite; or
identification of ephemeris information of at least one satellite.

3. The method of claim 1, wherein the determining, by the terminal device using the Doppler shift assistance information, the actual frequency to be measured comprises:
determining, by the terminal device using the Doppler shift assistance information, at least one Doppler shift corresponding to at least one SMTC which corresponds to the SSB frequency to be measured; and
for the at least one SMTC, obtaining, at least one actual frequency to be measured by adding the SSB frequency to be measured to the at least one Doppler shift corresponding to the at least one SMTC, respectively.

4. The method of claim 3, wherein the determining, by the terminal device using the Doppler shift assistance information, the at least one Doppler shift comprises:
querying, by the terminal device using identification of ephemeris information of at least one satellite in the Doppler shift assistance information, pre-configured ephemeris information;
determining, by the terminal device according to a result of the querying, ephemeris information of the at least one satellite;
determining, by the terminal device using the ephemeris information of the at least one satellite, at least one of a moving direction or a moving speed of the at least one satellite;
determining, by the terminal device, at least one of a moving direction or a moving speed of the terminal device; and determining, by the terminal device according to at least one of the moving direction or the moving speed of the at least one satellite and at least one of the moving direction or the moving speed of the terminal device, a Doppler shift for the at least one satellite.

5. The method of claim 3, wherein the determining, by terminal device using the Doppler shift assistance information, the at least one Doppler shift comprises:

determining, by the terminal device using ephemeris information of at least one satellite in the Doppler shift assistance information, at least one of a moving direction or a moving speed of the at least one satellite;

determining, by the terminal device, at least one of a moving direction or a moving speed of the terminal device; and determining, by the terminal device according to at least one of the moving direction or the moving speed of the at least one satellite and at least one of the moving direction or the moving speed of the terminal device, the Doppler shift for the at least one satellite.

6. The method of claim 5, wherein the determining, by the terminal device, at least one of the moving direction or the moving speed of the terminal device comprises:

determining, according to a capability of Global Navigation Satellite System (GNSS) of the terminal device, at least one of the moving direction or the moving speed of the terminal device.

7. A method for determining a frequency, comprising:

transmitting, by a network device, Doppler shift assistance information, wherein the Doppler shift assistance information is used to determine an actual frequency to be measured, wherein the transmitting, by the network device, the Doppler shift assistance information comprises:

transmitting, by the network device, Radio Resource Control (RRC) measurement configuration information, wherein the RRC measurement configuration information comprises following information:

a SSB frequency to be measured;

at least one piece of Synchronization Signal/Physical Broadcast Channel (SS/PBCH) Block (SSB) Measurement Timing Configuration (SMTC) information corresponding to the SSB frequency to be measured; and Doppler shift assistance information corresponding to each of the at least one piece of the SMTC information.

8. The method of claim 7, wherein the Doppler shift assistance information comprises at least one of:

at least one piece of Doppler shift information;

ephemeris information of at least one satellite; or identification of ephemeris information of at least one satellite.

9. The method of claim 7, wherein the Doppler shift assistance information is used for a terminal device to determine at least one Doppler shift corresponding to at least one SMTC, which corresponds to the SSB frequency to be measured; and obtain, for the at least one SMTC, at least one actual frequency to be measured by adding the SSB frequency to be measured to the at least one Doppler shift corresponding to the at least one SMTC, respectively.

10. The method of claim 9, wherein the Doppler shift assistance information is used for a terminal device to perform the following operations: querying pre-configured ephemeris information by using identification of ephemeris information of at least one satellite in the Doppler shift assistance information, determining ephemeris information of the at least one satellite according to a result of the querying; determining at least one of a moving direction or a moving speed of the at least one satellite by using the ephemeris information of the at least one satellite; and determining the Doppler shift for the at least one satellite according to at least one of the moving direction or the moving speed of the at least one satellite and at least one of a moving direction or a moving speed of the terminal device.

11. The method of claim 9, wherein the Doppler shift assistance information is used for the terminal device to determine at least one a moving direction or a moving speed of the at least one satellite by using ephemeris information of at least one satellite in the Doppler shift assistance information and determine the Doppler shift for the at least one satellite according to at least one of the moving direction or the moving speed of the at least one satellite and at least one of a moving direction or a moving speed of the terminal device.

12. A terminal device, comprising:

a processor;

a transceiver; and a memory for storing a computer program, wherein the processor is configured to execute the computer program to:

receive Doppler shift assistance information via the transceiver; and determine, using the Doppler shift assistance information, an actual frequency to be measured, wherein the processor is further configured to execute the computer program to receive Radio Resource Control (RRC) measurement configuration information, wherein the RRC measurement configuration information comprises following information:

a SSB frequency to be measured;

at least one piece of Synchronization Signal/Physical Broadcast Channel (SS/PBCH) Block (SSB) Measurement Timing Configuration (STMC) information corresponding to the SSB frequency to be measured; and Doppler shift assistance information corresponding to each of the at least one piece of the STMC information.

13. The terminal device of claim 12, wherein the Doppler shift assistance information comprises at least one of:

at least one piece of Doppler shift information;

ephemeris information of at least one satellite; or identification of ephemeris information of at least one satellite.

14. The terminal device of claim 12, wherein the processor is further configured to execute the computer program to:

determine, using the Doppler shift assistance information, at least one Doppler shift corresponding to at least one SMTC which corresponds to the SSB frequency to be measured; and for the at least one SMTC, obtain at least one actual frequency to be measured by adding the SSB frequency to be measured to the at least one Doppler shift corresponding to the at least one SMTC, respectively.

15. The terminal device of claim 14, wherein the processor is further configured to execute the computer program to:

query, using identification of ephemeris information of the at least one satellite in the Doppler shift assistance information, pre-configured ephemeris information;

determine, according to a result of the querying, ephemeris information of the at least one satellite;

determine, using the ephemeris information of the at least one satellite, at least one of a moving direction or a moving speed of the at least one satellite;

determine at least one a moving direction or a moving speed of the terminal device; and determine, according to at least one of the moving direction or the moving speed of the at least one satellite and at least one of the moving direction or the moving speed of the terminal device, the Doppler shift for the at least one satellite.

16. The terminal device of claim 14, wherein the processor is further configured to execute the computer program to:

determine, using ephemeris information of at least one satellite in the Doppler shift assistance information, at least one of a moving direction or a moving speed of the at least one satellite;

determine at least one of a moving direction or a moving speed of the terminal device; and determine, according to at least one of the moving direction or the moving speed of the at least one satellite and at least one of the moving direction or the moving speed of the terminal device, the Doppler shift for the at least one satellite.

17. The terminal device of claim 16, wherein the processor is further configured to execute the computer program to: determine, according to a capability of Global Navigation Satellite System (GNSS) of the terminal device, at least one of the moving direction or the moving speed of the terminal device.

* * * * *